Patented Mar. 2, 1948

2,436,980

UNITED STATES PATENT OFFICE 2,436,980

TIRE CORD AND METHOD OF MANUFACTURE

George P. Standley, Cleveland Heights, and Kenneth M. McLellan, Cleveland, Ohio, assignors to Industrial Rayon Corporation, Cleveland, Ohio, a corporation of Delaware No Drawing. Application January 1, 1945, Serial No. 571,027

18 Claims. (Cl. 57—140)

1

This invention relates to the production of improved tire cord structures which may be used as reinforcing materials in the production of such materials as, for example, reinforced rubber products, rubber tires, reinforced plastic materials, etc. The invention also provides new methods by which such reinforcing materials may be advantageously produced. For the purposes herein, the term "yarn" is meant to include filaments, threads, and the like, used in the production of the reinforcing materials of this invention.

The term "cord" or "cord structure" as used herein is intended to include single or multiple strands of twisted filamentary material used primarily for reinforcing purposes. The invention may be applied with particular advantage to such cord or cord structures having a denier of at least 500 and in which the cord components have been twisted at least 1.5 turns per inch.

In the production of reinforced rubber products such as, for example, rubber tires, belts, hose and the like, it is common practice to use a twisted cordlike material to reinforce the rubber structure. The cord is commonly made by twisting a suitable filamentary material such as, for example, cotton, rayon, nylon, etc., into intermediate strands or directly into final cord structures. Thus, for example, the cord structure may be made by twisting together one or more strands of yarn each of which strands has already been subjected to an initial twisting operation, or the cord structure may consist simply of a heavy strand of a material such as, for example, rayon having a denier in excess of 1500 which has been twisted a desired number of turns per inch.

The twisting operations to which the materials making up the cord are subjected in producing the cord generally result in a reduction in strength of the original yarn. To minimize such loss in strength, it is common practice to apply lubricants or conditioning agents of various types to the yarns before they are subjected to the twisting operation. While such lubricants may be effective to minimize loss in strength resulting from the twisting operations, they in many instances have an adverse effect on the properties of the cord when it is used as a reinforcing material in the production of, for example, rubber tires. For such purposes the reinforcing cord should not only have satisfactory tensile strength, high fatigue resistance, high flex life and excellent heat resistance, but should also have properties such that it can be made to adhere satisfactorily to the rubber structure.

When reinforcing cord structures made, for example, from viscous rayon are used in the fabrication of rubber products such as tires, it is common practice to dip the rayon cord structure in an aqueous latex dispersion prior to its incorporation in the rubber tire. This operation is performed to promote better adhesion between the cord structure and the rubber tire carcass. Due to the aqueous nature of the latex-dip dispersion and other circumstances in the operation, some yarn lubricants interfere with the absorption of the proper amount of latex solution by the cord structure and they are said to have poor "dip take-up" characteristics. The new cord structures of this invention, however, have satisfactory "dip take-up" characteristics and adhere remarkably well to the tire structures in which they are incorporated.

This invention provides a tire cord structure made from yarns which have been treated with a composition so as to minimize the loss in strength of the yarn due to twisting operations; it provides a cord product which adheres satisfactorily to a rubber structure and it also provides a cord having a high flex life and a high fatigue life.

In general, the new tire cord structures of the invention have deniers of at least 500 and are made from twisted filamentary material which material has been treated with a composition comprising certain sulfated or sulfonated derivatives and an ester of a fatty acid containing at least 12 carbon atoms with a polyhydric alcohol such as a hexahydric alcohol or its anhydro-derivatives.

The sulfated and sulfonated derivatives employed in practicing the invention may be sulfated or sulfonated mineral oils, vegetable oils, marine oils or higher fatty acids and alcohols containing at least 12 carbon atoms. Mixtures containing both sulfated and sulfonated derivatives may be employed with advantage.

Among the sulfated and sulfonated derivatives may be mentioned those derived from vegetable oils such as, for example, linseed, soybean, corn, peanut, castor, rapeseed and olive oils. Marine oil derivatives may advantageously be derived from such oils as sperm oil, whale oil, menhaden oil, etc.

Other sulfated and sulfonated derivatives which may be employed in practicing the invention include those derived from higher fatty alcohols containing 12 or more carbon atoms, e. g., lauryl, myristyl, cetyl and stearyl alcohols as well as products derived from higher fatty acids containing 12 or more carbon atoms such as, for example, those obtainable from vegetable or marine oils, e. g., castor oil fatty acids, lauric acid, oleic acid, linseed oil fatty acids, sperm oil fatty acids, coconut oil fatty acids, etc.

The sulfated and sulfonated derivatives should advantageously have an organically bound $SO_3$ content of no more than about 23%, by weight, on an anhydrous basis. They are advantageously employed in the form of their soluble salts, e. g., the sodium salts, or organic salts, e. g., alkylolamine salts.

It is advantageous in practicing the invention to employ not only a sulfated or sulfonated derivative of the type referred to above in association with the esters of a hexahydric alcohol but, in addition, to include in the composition mineral, vegetable or marine oils. For this purpose mineral oils having viscosities at 100° F. of from about 30 to 180 Saybolt seconds may be employed with advantage. For the same purpose one may employ marine oils such as, for example, sperm oil, whale oil, menhaden oil, etc., or vegetable oils such as, for example, castor, peanut, corn, soybean, olive or linseed oil.

The esters may be derived from such hexahydric alcohols or hexitols as sorbitol, mannitol or dulcitol or the anhydro-derivatives of such alcohols including, for example, hexitans and hexides, such as, sorbitan, mannitan, sorbide, mannide, etc. The fatty acid portion of the ester is advantageously derived from fatty acids containing at least 12 carbon atoms and may include lauric, myristic, palmitic, stearic and unsaturated or hydroxy acids such as oleic, ricinoleic, etc. The esters may be either predominantly mono-, di-, tri- or tetra-esters, or mixtures thereof, and should advantageously have a melting point above 30° C. Among the specific esters which may be employed with advantage may be mentioned sorbitol tetrastearate, sorbitan monopalmitate, sorbitan monolaurate, mannitan monopalmitate, mannide monooleate, etc.

The proportions of the various ingredients employed in the yarn-conditioning composition may be varied but, in general, in compositions containing only the ester of the hexahydric alcohol and a sulfated or sulfonated product, the amount of the ester may range from about 5% to about 80%, the sulfated or sulfonated derivative representing the remainder of the composition. In yarn-conditioning compositions containing a mineral, marine or vegetable oil in addition to the sulfated or sulfonated derivative, the ester of the hexahydric alcohol may again advantageously range from about 5% to 80%, by weight; the sulfated or sulfonated derivative should constitute at least about 5%, by weight, and the marine, mineral or vegetable oil should represent about 15% to 90% of the composition.

The proportions indicated in the preceding paragraph are desirable whether the yarn-conditioning composition is employed in the liquid or molten form or whether it is applied in the form of a suitable dispersion. In the latter case, the proportions given above are those which should obtain for the yarn-conditioning constituents themselves irrespective of the amount of dispersing medium employed in association with them.

The yarn-conditioning composition is advantageously employed in the form of an aqueous dispersion containing from about 0.05% to about 5.0% in the aggregate of the active composition ingredients and it has been found particularly advantageous to use concentrations of about 0.3% to 3.0%. The amount of the active components of the yarn-conditioning composition deposited on a normally dry yarn as a result of treatment with the composition advantageously ranges from about 0.1% to 4.5%, by weight, of the yarn.

Although the yarn-conditioning agent may be applied to the filamentary material directly in the molten or undiluted form, it is more advantageously applied in a diluted form such as a solution or dispersion depending somewhat upon the degree of solubility or dispersibility of the components in the medium employed. It is, however, considered more advantageous to treat the filamentary material with an aqueous dispersion of the yarn-conditioning composition. When employing such a treatment, it has been found advantageous to include in the aqueous dispersion a suitable dispersing agent such as, for example, triethanolamine. Other alkaline dispersing agents may be used if desired. In general, the aqueous dispersions may be prepared by melting the ester and mixing therewith the other composition ingredients together with a small amount of an alkaline dispersing agent such as triethanolamine, then adding and mixing water in an amount sufficient for any desired concentration and, finally, passing the mixture through a colloid mill.

The yarn-conditioning composition is applied to the filamentary material prior to the various yarn twisting and cord construction operations and the treated filamentary material may, if desired, be dried before being subjected to twisting. In the production of textile yarns and cord structures from materials such as continuous multifilament viscose rayon yarn, it is particularly advantageous to treat the yarn before it has been subjected to the first drying step normally incident to its production. This may be done with especial advantage when the viscose rayon is produced by the continuous process as described, for example, in Torrence Patent No. 2,284,497 by applying the yarn-conditioning emulsion or dispersion to the viscose rayon just prior to the delivery of the yarn to the drying reel on which the yarn is continuously dried prior to twisting. The amount of the yarn-conditioning composition deposited on a normally dry yarn as a result of the treatment advantageously ranges from about 0.1% to 4.5%, by weight, of the yarn.

The invention will be more fully described by reference to the following examples although it is to be understood that the invention is not limited thereto.

*Example 1*

181.5 parts, by weight, of sorbitan monopalmitate are melted and mixed with 1.8 parts, by weight, of triethanolamine and the mixture heated to about 60° C. To this is added a mixture of oils as follows: 29 parts of sulfonated castor oil, 116 parts of sulfonated mineral oil and 581 parts of mineral oil.

The mass is then thoroughly mixed by stirring while maintaining the temperature at about 60° C. and 90 parts, by weight, of ortho phenyl phenol, a bactericide, are added. While the mass is maintained at this temperature, sufficient water at room temperature is added and thoroughly mixed to form an aqueous mixture having a concentration of about 8%, by weight. The aqueous mixture is then passed through a Manton-Gaulin Company colloid mill at a clearance setting of about 0.013 inch. Sufficient water is added to yield a final dispersion having a concentration of about 0.35%, by weight, of the composition ingredients.

The above dispersion is applied to a wet, freshly spun and processed 1100-denier, 480-filament viscose rayon yarn while it is being temporarily stored on a thread-advancing, thread-storage reel just prior to the drying stage of a continuous rayon spinning and processing machine as described, for example, in Torrence Patent No. 2,284,497. The yarn is treated for about ten to fifteen seconds. The treated yarn is then continuously advanced to a succeeding thread-advancing, thread-storage device upon which it is dried. Thereafter, the yarn is given about 1.5 turns per inch of Z-twist and collected on a spool. The resulting yarn thereafter has its twist increased to about 14 turns per inch of Z-twist and two strands of the resulting Z-twisted yarn are then plied together with about 11½ turns per inch in the opposite direction (S-twist). Ether extraction of the resulting dried cord shows that about 0.33%, by weight, of the composition ingredients are present on the filamentary material used in forming the cord. The cord shows desirable latex-dipping characteristics, has high tensile strength and excellent fatigue resistance.

*Example 2*

A 0.35%, by weight, aqueous dispersion is prepared in the manner and under the conditions set forth in Example 1 with the exception that the following ingredients and parts, by weight, are used: 100 parts of sorbitan monopalmitate, 1 part of triethanolamine, 20 parts of orthophenylphenol and an oil mixture comprising 68 parts of sulfonated mineral oil and 32 parts of mineral oil. The conditioning agent so prepared is applied to a viscose rayon yarn such as that described in Example 1 and a cord is produced in the manner and under the conditions set forth in Example 1.

The cord exhibits satisfactory latex-dipping characteristics together with high tensile strength and fatigue life.

*Example 3*

A 0.4%, by weight, aqueous dispersion is prepared in the manner and under the conditions set forth in Example 1 with the exception that the following ingredients and parts, by weight, are used: 80 parts of mannitan monopalmitate and 20 parts of sulfonated corn oil having an organic $SO_3$ content on an anhydrous basis of about 4.62%. The conditioning agent so prepared is applied to viscose rayon filamentary material as described in Example 1 and a cord is produced from such treated material in the manner and under the conditions set forth in Example 1. The cord exhibits desirable latex dipping characteristics and shows satisfactory tensile strength and fatigue life.

*Example 4*

A 0.35%, by weight, aqueous dispersion is prepared in the manner and under the conditions set forth in Example 1 with the exception that the following ingredients and parts, by weight, are used: 20 parts of sorbitan monopalmitate and 80 parts of sulfonated castor oil having an organic $SO_3$ content, on an anhydrous basis, of about 11.93%.

The 0.35%, by weight, aqueous dispersion so prepared is applied to viscose rayon filamentary material as described in Example 1 and a cord structure is produced in the manner and under the conditions set forth in Example 1. The cord shows satisfactory latex-dipping characteristics together with high tensile strength and fatigue life.

*Example 5*

A 0.35%, by weight, aqueous dispersion is prepared in the manner and under the conditions set forth in Example 1 with the exception that the following ingredients and parts, by weight, are used: 30 parts of sorbitan monopalmitate, 35 parts of peanut oil and 35 parts of sulfonated peanut oil having an organic $SO_3$ content, on an anhydrous basis, of about 6.93%, by weight. The yarn-conditioning composition so prepared is applied to viscose rayon filamentary material as described in Example 1 and a cord is produced from such treated material in the manner and under the conditions set forth in Example 1. The cord exhibits desirable latex-dipping characteristics and shows satisfactory tensile strength and fatigue life.

*Example 6*

60 parts, by weight, of sorbitan monopalmitate are melted and mixed with 0.6 part, by weight, of triethanolamine and the mixture heated to about 60° C. To this is added the following parts, by weight: 26.7 parts of olive oil and a mixture of the following oils: 53 parts of mineral oil and 8 parts of sulfonated mineral oil.

The mixture of the palmitate and the oils is thoroughly mixed by stirring while maintaining the temperature at about 60° C. and 9 parts, by weight, of ortho phenyl phenol are added. The mixture, while maintained at this temperature, is added and stirred into a body of water sufficient to form an aqueous mixture having a concentration of about 25%, by weight. The aqueous mixture is then passed through a Manton-Gaulin Company colloid mill at a clearance setting of about 0.013 inch. Sufficient water is added to form a dispersion having a concentration of about .4%, by weight, of the composition ingredients. The yarn-conditioning composition so prepared is applied to viscose rayon filamentary material as described in Example 1 and a cord is produced from such treated material in the manner and under the conditions set forth in Example 1. The cord exhibits desirable latex dipping characteristics and shows satisfactory tensile strength and fatigue life.

*Example 7*

A 0.35%, by weight, aqueous dispersion is prepared in the manner and under the conditions set forth in Example 1 with the exception that the following ingredients and parts, by weight, are used: 5 parts of sorbitan monopalmitate and 95 parts of lauryl sulfate.

The conditioning agent so prepared is applied to viscose rayon filamentary material as described in Example 1 and a cord is produced from such treated material in the manner and under the conditions set forth in Example 1. The cord exhibits desirable latex dipping characteristics and shows satisfactory tensile strength and fatigue life.

Although the foregoing examples have illustrated the application of the invention to cord structures from 1100 denier filament rayon, it is to be understood that the invention is not intended to be limited thereto. The invention may be employed with advantage in producing tire cord structures of other deniers made from any natural or artificial organic filamentary material.

The invention may be applied with particular advantage to cord structures made by plying together two or more strands of filamentary material, each having a denier of at least 1000 and in which the strands have been given a twist in one direction of from about five to twenty turns per inch and in which the twisted strands have then been plied into a cord by giving them a ply twist in the opposite direction of about five to fifteen turns per inch.

The invention may also be applied to the production of cords from filamentary material having a denier of at least 1500 which is subjected to at least one and one half turns per inch of twist, including such structures as are described, for example, in Patent No. 2,103,245 to E. G. Budd.

Although the invention may be used with particular advantage in the production of tire cord structures from viscose rayon, it is also applicable to the production of such materials from other types of filamentary materials. These may include, for example, natural or artificial organic filamentary materials among which may be mentioned such natural cellulosic filamentary materials as cotton, flax, hemp, ramie, etc., and such artificial yarns as those made from regenerated cellulose by the viscose or cuprammonium process as well as cellulose ethers and cellulose esters, the latter including cellulose acetates and deacylated cellulose acetate fibers.

The invention may also be employed with such artificial organic filamentary materials as those produced from polymerized polyamides, e. g., nylon, or from hydrocarbon polymers or their derivatives including vinyl, vinylidine and styrene polymers.

The new tire cord structures of this invention have properties highly desirable in the art. The improved fatigue resistance, high flex life, excellent heat resistance and high tensile strength of the new cord structures make possible the production of rubber tires having improved operating characteristics.

We claim:

1. The method of producing a tire cord having a denier of at least 500 which comprises treating a filamentary material with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms, and (b) an ester of a fatty acid containing at least 12 carbon atoms with a polyhydric alcohol selected from the group consisting of hexahydric alcohols and the anhydro derivatives of such alcohols; and thereafter twisting said treated filamentary material to form said tire cord.

2. The method of producing a tire cord having a denier of at least 500 which comprises treating a filamentary material with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms; (b) an ester of a fatty acid containing at least 12 carbon atoms with a polyhydric alcohol selected from the group consisting of hexahydric alcohols and the anhydro derivatives of such alcohols, and (c) an oil selected from the group consisting of mineral, vegetable and marine oils; and thereafter twisting said treated filamentary material at least 1.5 turns per inch to form said tire cord.

3. The method of producing a tire cord having a denier of at least 500 which comprises treating a cellulosic filamentary material with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms; (b) an ester of a fatty acid containing at least 12 carbon atoms with a polyhydric alcohol selected from the group consisting of hexahydric alcohols and the anhydro derivatives of such alcohols; said ester component (b) having a melting point of at least 30° C.; said filamentary material being treated so that it contains about 0.1% to 4.5%, by weight, of said composition; twisting individual strands of said treated filamentary material in one direction at least about 1.5 turns per inch and thereafter twisting together a plurality of said treated and twisted strands in the opposite direction to form said tire cord.

4. The method of producing a tire cord having a denier of at least 500 which comprises treating a cellulosic filamentary material with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms, (b) an ester of a fatty acid containing at least 12 carbon atoms with a polyhydric alcohol selected from the group consisting of hexahydric alcohols and the anhydro derivatives of such alcohols, said component (b) having a melting point of at least about 30° C., and (c) an oil selected from the group consisting of mineral, vegetable and marine oils; said filamentary material being treated so that it contains about 0.1% to 4.5%, by weight, of said composition; twisting individual strands of said treated filamentary material at least about 1.5 turns per inch in one direction and thereafter twisting together a plurality of said treated and twisted strands in the opposite direction to form said tire cord.

5. The method of producing a tire cord having a denier of at least 500 which comprises treating a cellulosic filamentary material with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms, and (b) an ester of a fatty acid containing at least 12 carbon atoms with a hexitan polyhydric alcohol; and thereafter twisting said treated filamentary material at least about 1.5 turns per inch to form said tire cord.

6. The method of producing a tire cord having a denier of at least 1000 which comprises treating a regenerated cellulose filamentary material with an aqueous dispersion of a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms, and (b) an ester of a fatty acid containing at least 12 carbon atoms with a hexitan polyhydric alcohol, said component (b) having a melting point of at least about 30° C., and (c) an oil selected from the group consisting of mineral, vegetable and marine oils; said filamentary material being treated so that it contains about 0.1% to 4.5%, by weight, of said composition; twisting individual strands of said treated filamentary material at least about 1.5 turns per inch in one direction and thereafter twisting together a plurality of said treated and twisted strands in the opposite direction to form said tire cord.

7. The method of producing a tire cord having a denier of at least 1000 which comprises treating a regenerated cellulose filamentary material with an aqueous dispersion of a composition comprising sorbitan monopalmitate and a sulphonated mineral oil; said filamentary material being treated so that it contains about 0.1% to 4.5%, by weight, of said composition; twisting individual strands of said treated filamentary material at least 1.5 turns per inch in one direction and thereafter twisting together a plurality of said treated and twisted strands in the opposite direction to form said tire cord.

8. The method of producing a tire cord having a denier of at least 1000 which comprises treating a regenerated cellulose filamentary material with an aqueous dispersion of a composition comprising a sulphonated mineral oil and sorbitol tetrastearate; said filamentary material being treated so that it contains about 0.1% to 4.5%, by weight, of said composition; twisting individual strands of said treated filamentary material at least 1.5 turns per inch in one direction and thereafter twisting together a plurality of said treated and twisted strands in the opposite direction to form said tire cord.

9. The method of producing a tire cord having a denier of at least 1000 which comprises treating a regenerated cellulose filamentary material with an aqueous dispersion of a composition comprising a sulphonated mineral oil and mannide monooleate; said filamentary material being treated so that it contains about 0.1% to 4.5%, by weight, of said composition; twisting individual strands of said treated filamentary material at least 1.5 turns per inch in one direction and thereafter twisting together a plurality of said treated and twisted strands per inch in the opposite direction to form said tire cord.

10. A tire cord having a denier of at least 500 and made from twisted filamentary material, said filamentary material having been treated with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms, and (b) an ester of a fatty acid containing at least 12 carbon atoms with a polyhydric alcohol selected from the group consisting of hexahydric alcohols and the anhydro derivatives of such alcohols.

11. A tire cord having a denier of at least 500 and made from twisted filamentary material, said filamentary material having been treated with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms, (b) an ester of a fatty acid containing at least 12 carbon atoms with a polyhydric alcohol selected from the group consisting of hexahydric alcohols and the anhydro derivatives of such alcohols, and (c) an oil selected from the group consisting of mineral, vegetable and marine oils.

12. A tire cord having a denier of at least 500 and made from twisted cellulosic filamentary material, said filamentary material having been treated with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms, and (b) an ester of a fatty acid containing at least 12 carbon atoms with a hexitan polyhydric alcohol.

13. A tire cord having a denier of at least 1000 and made from twisted and plied regenerated cellulose filamentary material, said filamentary material having been treated with a composition comprising (a) a compound selected from the group consisting of sulphated and sulphonated derivatives of mineral oils, vegetable oils, marine oils, higher fatty acids and higher fatty alcohols, said acids and alcohols containing at least 12 carbon atoms, (b) an ester of a fatty acid containing at least 12 carbon atoms with a hexitan polyhydric alcohol, said ester component (b) having a melting point of at least about 30° C., and (c) an oil selected from the group consisting of mineral, vegetable and marine oils; said filamentary material being treated so that it contains about 0.1% to 4.5%, by weight, of said composition.

14. A tire cord having a denier of at least 1000 and made from twisted and plied regenerated cellulose filamentary material, said filamentary material having been treated with a composition comprising sorbitan monopalmitate and a sulphonated mineral oil; said filamentary material being treated so that it contains about 0.1% to 4.5%, by weight, of said composition.

15. A tire cord having a denier of at least 1000 and made from twisted and plied regenerated cellulose filamentary material, said filamentary material having been treated with a composition comprising sorbitol tetrastearate and a sulphonated mineral oil; said filamentary material being treated so that it contains about 0.1% to 4.5%, by weight, of said composition.

16. A tire cord having a denier of at least 1000 and made from twisted and plied regenerated cellulose filamentary material, said filamentary material having been treated with a composition comprising mannide mono-oleate and a sulphonated mineral oil; said filamentary material being treated so that it contains about 0.1% to 4.5%, by weight, of said composition.

17. A re-enforced rubber structure comprising a tire cord as defined in claim 10.

18. A re-enforced rubber structure comprising a tire cord as defined in claim 13.

GEORGE P. STANDLEY.
KENNETH M. McLELLAN.

REFERENCES CITED

The following references are of record in the file of this patent:

UNITED STATES PATENTS

| Number | Name | Date |
|---|---|---|
| 1,491,228 | Genstein | Apr. 22, 1924 |
| 1,771,347 | Pressell | July 22, 1930 |
| 2,039,279 | Bouhuys | May 5, 1936 |
| 2,089,187 | Dreyfus et al. | Aug. 10, 1937 |
| 2,093,468 | Moscowitz | Sept. 21, 1937 |
| 2,116,064 | Dreyfus et al. | May 3, 1938 |
| 2,144,354 | Whitehead | Jan. 17, 1939 |
| 2,150,569 | Whitehead | Mar. 14, 1939 |
| 2,151,952 | Wasum | Mar. 28, 1939 |
| 2,201,992 | Dreyfus et al. | May 28, 1940 |
| 2,235,867 | Castricum | Mar. 25, 1941 |
| 2,273,200 | Hoff | Feb. 17, 1942 |
| 2,285,422 | Epstein et al. | June 9, 1942 |
| 2,339,200 | Sowe | Jan. 11, 1944 |

OTHER REFERENCES

"Spans and Tweens," Atlas Powder Co., pages 1, 2, 11–14 and 16, Dec. 1943.

Certificate of Correction

Patent No. 2,436,980. March 2, 1948.

GEORGE P. STANDLEY ET AL.

It is hereby certified that errors appear in the printed specification of the above numbered patent requiring correction as follows: Column 2, lines 27 and 28, for "anhydro-derivatives" read *anhydro derivatives*; line 42, after the word "oil" strike out the period; column 3, line 16, for "anhydro-derivatives" read *anhydro derivatives*; and that the said Letters Patent should be read with these corrections therein that the same may conform to the record of the case in the Patent Office.

Signed and sealed this 8th day of June, A. D. 1948.

[SEAL]

THOMAS F. MURPHY,
*Assistant Commissioner of Patents.*